No. 772,101. PATENTED OCT. 11, 1904.
L. HOUSE.
VEHICLE BRAKE.
APPLICATION FILED NOV. 14, 1903.

NO MODEL. 2 SHEETS—SHEET 1.

WITNESSES:
J. J. Laass.
E. L. Meier.

INVENTOR
Louis House
By E. Laass
ATTORNEY.

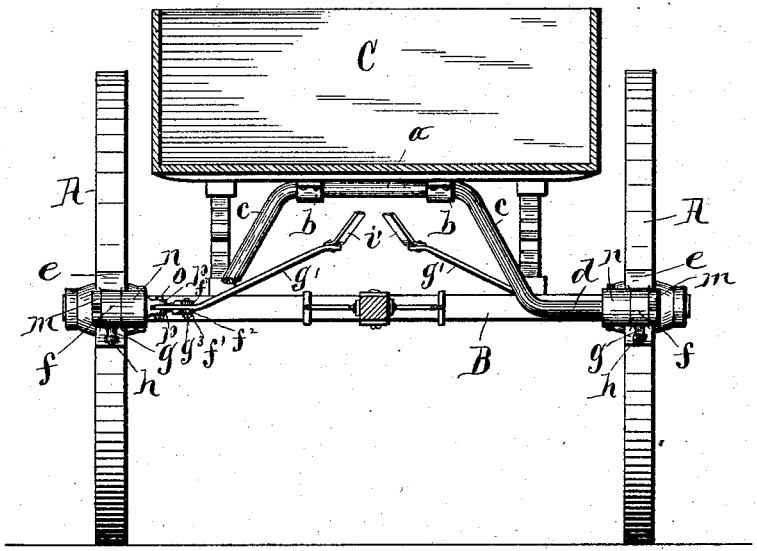
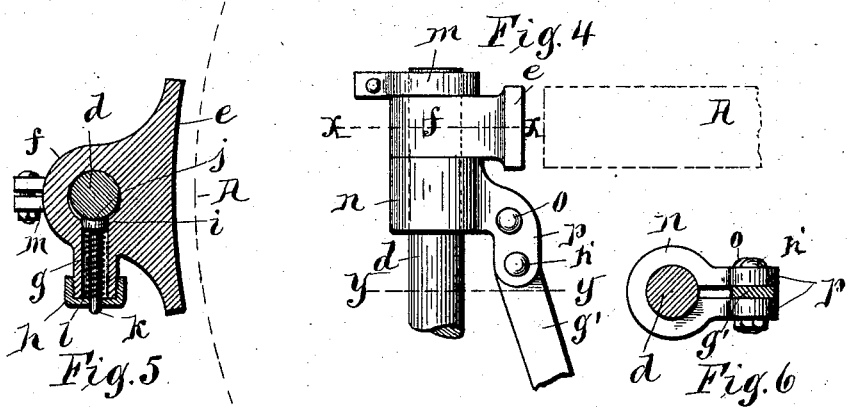
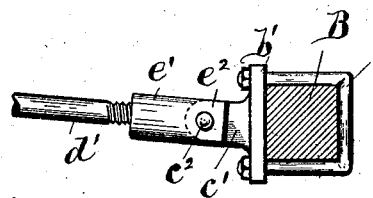

No. 772,101.

Patented October 11, 1904.

UNITED STATES PATENT OFFICE.

LOUIS HOUSE, OF SYRACUSE, NEW YORK.

VEHICLE-BRAKE.

SPECIFICATION forming part of Letters Patent No. 772,101, dated October 11, 1904.

Application filed November 14, 1903. Serial No. 181,148. (No model.)

*To all whom it may concern:*

Be it known that I, LOUIS HOUSE, a citizen of the United States, and a resident of Syracuse, in the county of Onondaga, in the State of New York, have invented new and useful Improvements in Vehicle-Brakes, of which the following, taken in connection with the accompanying drawings, is a full, clear, and exact description.

This invention resides in a vehicle-brake which is an improvement upon the construction shown and described in my Letters Patent No. 721,446, dated February 24, 1903.

The object of the present invention is to simplify such construction and at the same time increase the efficiency and durability of the brake.

To that end the invention consists in the novel arrangement and combination of the component parts, as hereinafter fully described and set forth in the claims.

Figure 1:
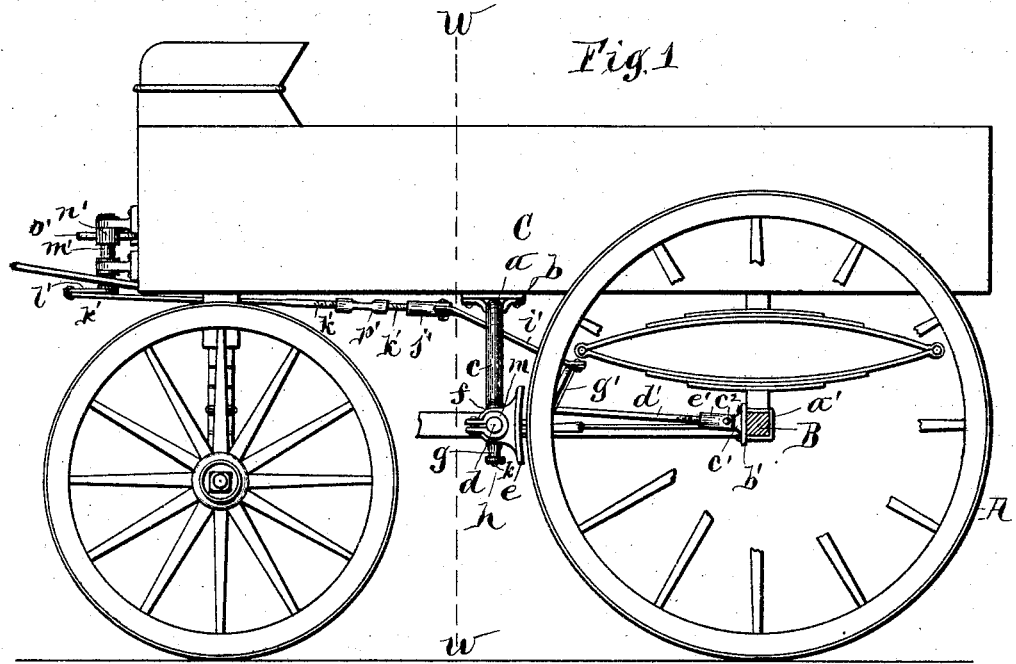
Figure 2:
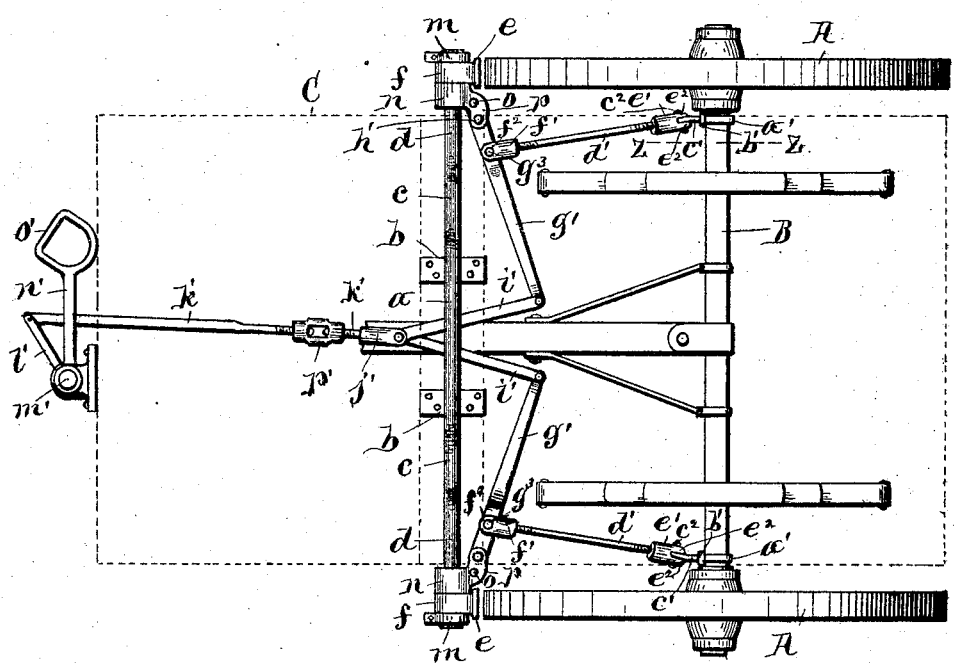

In the accompanying drawings, Figure 1 is a side view of a portion of a vehicle equipped with my improved brake. Fig. 2 is a plan view of a portion of the running-gear of the vehicle, the vehicle-body being indicated by dotted lines, and illustrating more clearly the invention. Fig. 3 is a vertical transverse section on line W W in Fig. 1. Fig. 4 is an enlarged detail view of one end portion of the hanger carrying the brake-shoe and showing the attachment of one of the levers which move the hangers. Figs. 5 and 6 are transverse sections on lines X X and Y Y, respectively, in Fig. 4; and Fig. 7 is an enlarged transverse section on line Z Z in Fig. 2.

Similar letters of reference indicate corresponding parts.

A A denote the rear wheels, and B is the rear axle of the running-gear, which may be of any well-known style.

C represents the vehicle-body, which is mounted upon the running-gear in the usual and well-known manner.

$a$ denotes a cross-bar which is disposed in front of the rear wheels and is supported on the under side of the body C by means of suitable boxes $b\ b$, whereby the said bar is permitted to oscillate. The end portions of the bar $a$ are bent downward to form hangers $c\ c$, which terminate with lateral extensions $d\ d$. On these extensions $d\ d$ are carried the brake-shoes $e\ e$, which are loosely pivoted thereto, as clearly shown in Fig. 5 of the drawings. Said shoes are each formed on the under side of the hub $f$ with a socket $g$, the outer end of which is closed by a screw-threaded cap $h$. The socket extends to the extension $d$, and in the socket is disposed a block $i$, formed with a concaved face $j$, which bears on the under side of the extension. The said block $i$ is formed with a stem $k$ extending through the socket and preferably through the cap $h$, and between the block and cap and surrounding the stem is a spiral spring $l$. This spring being expansive causes the hub of the shoe and the block to grip the extension, whereby the braking-surface of the shoe is maintained in concentricity with the wheel-tire, as shown in Fig. 5 of the drawings. Any suitable means may be employed for preventing the shoes from shifting longitudinally on the extensions. However, to sustain the shoes against outward movement on the extension I prefer to employ adjustable collars $m\ m$, clamped to said extensions.

$n\ n$ denote split collars which are mounted on the extensions $d\ d$ of the hangers and are clamped adjustably thereon by means of bolts $o\ o$ passing through ears $p\ p$ formed on the said collars. The said collars $n\ n$ are adjacent to the brake-shoes $e\ e$ and serve to prevent the latter from shifting inward on the extensions $d\ d$. The said adjustable collars $m\ n$ permit the brake-shoes to be shifted in relation to the wheel-tires. The ears of said collars $n\ n$ are bent to extend substantially parallel with the extensions $d\ d$ and away from the wheels A A, thereby preventing mud and dirt from becoming clogged between the ears and wheel-tires.

$a'\ a'$ represent clips which embrace the rear axle B of the vehicle adjacent to the wheel-hubs, the plates $b'\ b'$ of which clips are disposed at the front of the axle and are each formed with an ear $c'$.

$d'\ d'$ are rods which extend forwardly from the rear axle and are provided at their rear ends with screw-threaded couplings $e'\ e'$, formed with jaws $e^2\ e^2$, which embrace the said ears $c'\ c'$, and through said jaws and ears pass bolts $c^2 c^2$, by which the rods are pivotally connected at said ends. The forward ends of the said rods $d' d'$ are provided with couplings $f' f'$, formed with like jaws $f^2 f^2$, which are substantially in a plane with the axes of the brake-shoes, in which jaws are fulcrumed levers $g' g'$ by means of bolts $g^3 g^3$ passing through the jaws and levers. These levers $g' g'$ are pivotally connected at one end between the aforesaid ears $p p$ of the collars $n n$ by means of bolts $h' h'$. These ears are also substantially in a plane with the axes of said brake-shoes. Said bolts also assist in clamping the collars to the extensions $d d$, and therefore, if desired, the bolts $o o$ may be dispensed with. Said levers $g' g'$ extend toward each other and are preferably bent upward, as clearly shown in Figs. 1 and 3 of the drawings. To the inner or free ends of the levers are pivoted toggle-arms $i' i'$, which are preferably united by a suitable coupling $j''$. In the coupling $j''$ is secured one end of a rod $k'$, which extends forwardly therefrom and has its opposite end pivotally connected to an arm $l'$, rigidly secured to the lower end of a vertical post $m'$, suitably journaled on the front end of the vehicle-body C. To the upper portion of said post $m'$ is rigidly secured a foot-lever $n'$, which is normally substantially at right angles to the line of draft and is formed with a heel-receiving loop $o'$, as clearly shown in Fig. 2 of the drawings. By the operation of said foot-lever $n'$ the aforesaid levers $g' g'$ are actuated, which in turn move the hangers, and thereby carry the brake-shoes into and out of contact with the wheel A A. By moving the foot-lever $n'$ forwardly sufficiently to carry the rod $k'$ beyond the axis of the post $m'$ the shoes $e e$ become locked in their braking positions. The said rod $k'$ is preferably composed of two sections united by a suitable turnbuckle $p'$, which serves as an adjustment in the connection of the arm $l'$ to the toggle-arms $i' i'$. The aforesaid coupling $j''$ is preferably screw-threaded for the attachment of the rod $k'$.

What I claim as my invention is—

1. The combination with the vehicle-body, the rear wheels and the axle thereof, of a brake mechanism comprising a movable cross-bar, hangers connected to said cross-bar, lateral extensions formed integral with said hangers, brake-shoes mounted on said extensions, adjustable collars mounted on said extensions at opposite sides of the brake-shoes, suitably-fulcrumed levers pivoted to the respective inner collars, and means for actuating said levers as set forth.

2. The combination with the vehicle-body, the rear wheels and their axle, of a brake mechanism comprising a cross-bar pivotally supported on the under side of the vehicle-body, hangers formed integral with said cross-bar and terminating with integral lateral extensions, brake-shoes mounted on said extensions, rods pivoted at one end to the rear axle and extending forwardly therefrom, levers pivoted at one end directly to said extensions and fulcrumed on the forward ends of the said rods, and means pivotally connected to the other ends of said levers for actuating the said shoes as set forth.

3. The combination with the vehicle-body, the rear wheels and the axle thereof, of a brake mechanism comprising a cross-bar supported on the under side of the vehicle-body, hangers rigidly connected to said cross-bar, lateral extensions on said hangers and formed integral therewith, brake-shoes pivotally mounted on said extensions, adjustable collars on said extensions and sustaining the brake-shoes against lateral movement, the inner collars being formed with ears, rods pivoted at one end to the rear axle and extending forwardly therefrom, levers pivotally connected at one end to said ears and fulcrumed on the forward ends of said rods and extending toward each other, and a manually-operated lever pivotally connected to the adjacent ends of the aforesaid levers as set forth.

4. In a vehicle-brake, the combination of a cross-bar supported movably on the under side of the vehicle-body, a brake-shoe pivotally mounted on said cross-bar and having a hub formed with a socket extending radially from the cross-bar, a removable cap closing the outer end of the socket, a block in said socket, and yielding means disposed between said cap and block and pressing the latter firmly against the cross-bar for the purpose set forth.

5. In a vehicle-brake, the combination with a cross-bar supported movably on the under side of the vehicle-body, of the brake-shoe pivotally supported on said bar and having its hub formed on its under side with a socket, a removable cap closing the outer end of the socket, a block in said socket and bearing on the under side of the cross-bar, a stem extending from said block through the socket, a spiral spring disposed between the block and cap and surrounding the said stem and operative to maintain the braking-surface in concentricity with the wheel, and means for moving said cross-bar to carry the brake-shoes into and out of contact with the wheel as set forth.

LOUIS HOUSE.

Witnesses:
J. J. LAASS,
FRED. PUTVIN.